United States Patent

[11] 3,571,807

[72] Inventors James C. Candy
Convent Station;
Frank W. Mounts, Colts Neck, N.J.
[21] Appl. No. 775,458
[22] Filed Nov. 13, 1968
[45] Patented Mar. 23, 1971
[73] Assignee Bell Telephone Laboratories, Incorporated
Murray Hill, N.J.

[54] REDUNDANCY REDUCTION SYSTEM WITH DATA EDITING
7 Claims, 2 Drawing Figs.

[52] U.S. Cl. .......... 340/172.5
[51] Int. Cl. .......... G06f 7/02
[50] Field of Search .......... 340/172.5; 235/157

[56] References Cited

UNITED STATES PATENTS 3,289,169 11/1966 Marosz .......... 340/172.5
3,344,406 9/1967 Vinal .......... 340/172.5

*Primary Examiner*—Raulfe B. Zache
*Attorneys*—R. J. Guenther and E. W. Adams, Jr.

ABSTRACT: A redundancy reduction system is described for use with signals such as video signals which have frame-to-frame redundancy. An entire frame of samples from the signal is stored in a frame memory. Each new sample from the signal is compared with its corresponding stored sample having the same time position within the frame. If a significant difference is found to exist between the two samples, the new sample is placed into the frame memory replacing the old sample, and in addition an identification or flag signal is placed into a flag memory at a corresponding address. A searching circuit scans the flag memory and detects those address locations which have been marked by a flag or identification signal. In response to detecting a flag at a particular address location the sample stored in the frame memory at that address location is read out of the frame memory and coupled to a digital transmitter for transmission to a receiving location.

PATENTED MAR 23 1971 3,571,807

SHEET 1 OF 2

INVENTORS J. C. CANDY
F. W. MOUNTS

BY Daniel D. Dubosky

ATTORNEY

REDUNDANCY REDUCTION SYSTEM WITH DATA EDITING

BACKGROUND OF THE INVENTION

This invention relates to a redundancy reduction system, and more particularly, to a redundancy reduction system in which the data selected to be transmitted is edited in the sense that only the most recent data is transmitted.

Redundancy reduction systems are defined in the art as systems which transmit only those samples from a signal source which are essential to a reconstruction of the signal. In the copending application entitled "Redundancy Reduction System for Use with Video Signals," Ser. No. 749,770 filed in the name of F. W. Mounts, each new sample from a video signal is compared with a sample previously stored in a video frame memory, the stored sample having the same corresponding time position in a video frame. If a significant difference is found to exist between the two samples, the new sample is placed into the video frame memory, replacing the previously stored sample, and in addition is placed into a buffer memory to await transmission to the receiving location.

During periods of great activity in the scene being viewed, a large number of significant differences is found to exist, thereby causing a large number of samples to be placed into the buffer memory to await transmission. To prevent buffer overflow the number of samples stored in the buffer memory is utilized as a parameter to determine the amount of difference which must be found to exist during the comparison between a new sample and stored sample before transmission of the new sample is warranted. The more nearly the buffer memory is filled to its maximum capacity, the greater the difference must be before the difference is deemed to be of sufficient significance so as to warrant transmission of the new sample. Consequently, rapidly moving scenes cause the buffer memory to produce a large threshold requirement on the difference which in turn causes the quality of the transmitted picture to be degraded. To avoid degradation of the picture in the prior art systems, a large buffer memory is required. A large buffer memory however is expensive and in addition causes a large amount of undesirable delay to be introduced into the transmitted signal.

SUMMARY OF THE INVENTION

A primary object of the present invention is to reduce the redundancy in the signals which are transmitted from a framed digital signal, such as video, by utilizing apparatus which does not require a large buffer memory.

Still another object of the present invention is to transmit the selected samples without introducing a large amount of delay.

In accordance with the present invention each new sample obtained from a source of framed digital words is compared with a previously stored sample having the same time position within the frame. If a significant difference is found to exist between the two samples, the new sample is placed into a frame memory, replacing the old sample, and in addition an identification or flag signal is placed into a flag memory at a corresponding address. A searching circuit scans the flag memory and detects those address locations which have been marked by a flag or identification signal. In response to detecting a flag at a particular address location, the sample stored in the frame memory at that address location is read out of the frame memory and coupled to a digital transmitter for transmission to the receiving location. If a significant difference occurs at an address location that has been previously marked by a flag, the new sample is inserted and the old sample discarded, even though the old sample had not yet been selected for transmission to the receiving location. In this way, only the most recent samples continue to be stored in the frame memory and transmitted to the receiving location. Hence, the large buffer memory found in prior art systems is replaced in the present invention by a much smaller lower cost flag memory, and the inherent delay accompanying a large buffer memory is removed at the cost of some data destruction.

BRIEF DESCRIPTION OF THE DRAWING

The invention will be more readily understood after reading the following description in conjunction with the drawing in which.

DETAILED DESCRIPTION

Figure 1:
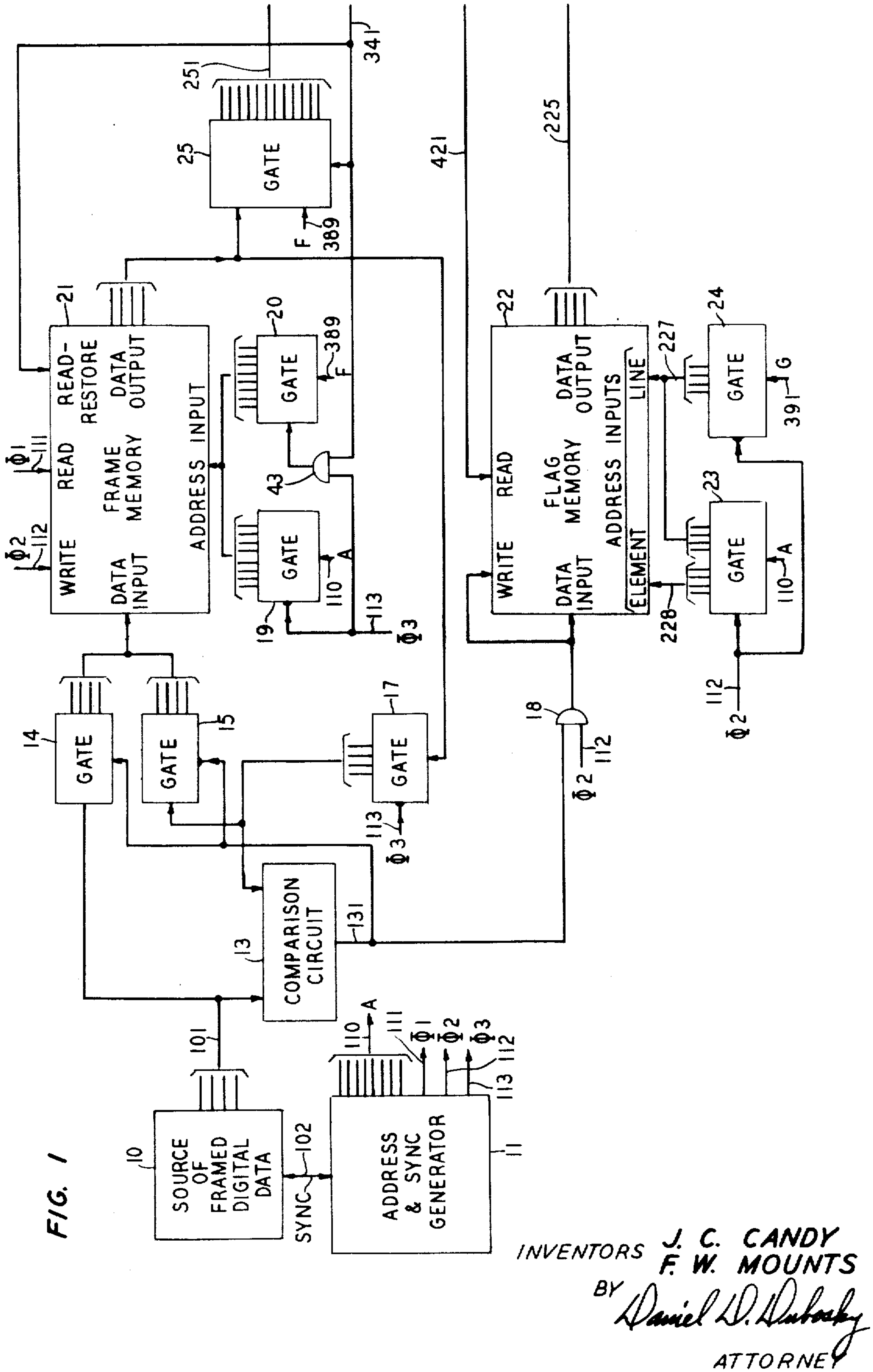
FIGS. 1 and 2, when placed in juxtaposition with FIG. 2 to the right of FIG. 1 and connecting identically designated lines in each figure, provide a schematic block diagram of one embodiment of the present invention.
Figure 2:
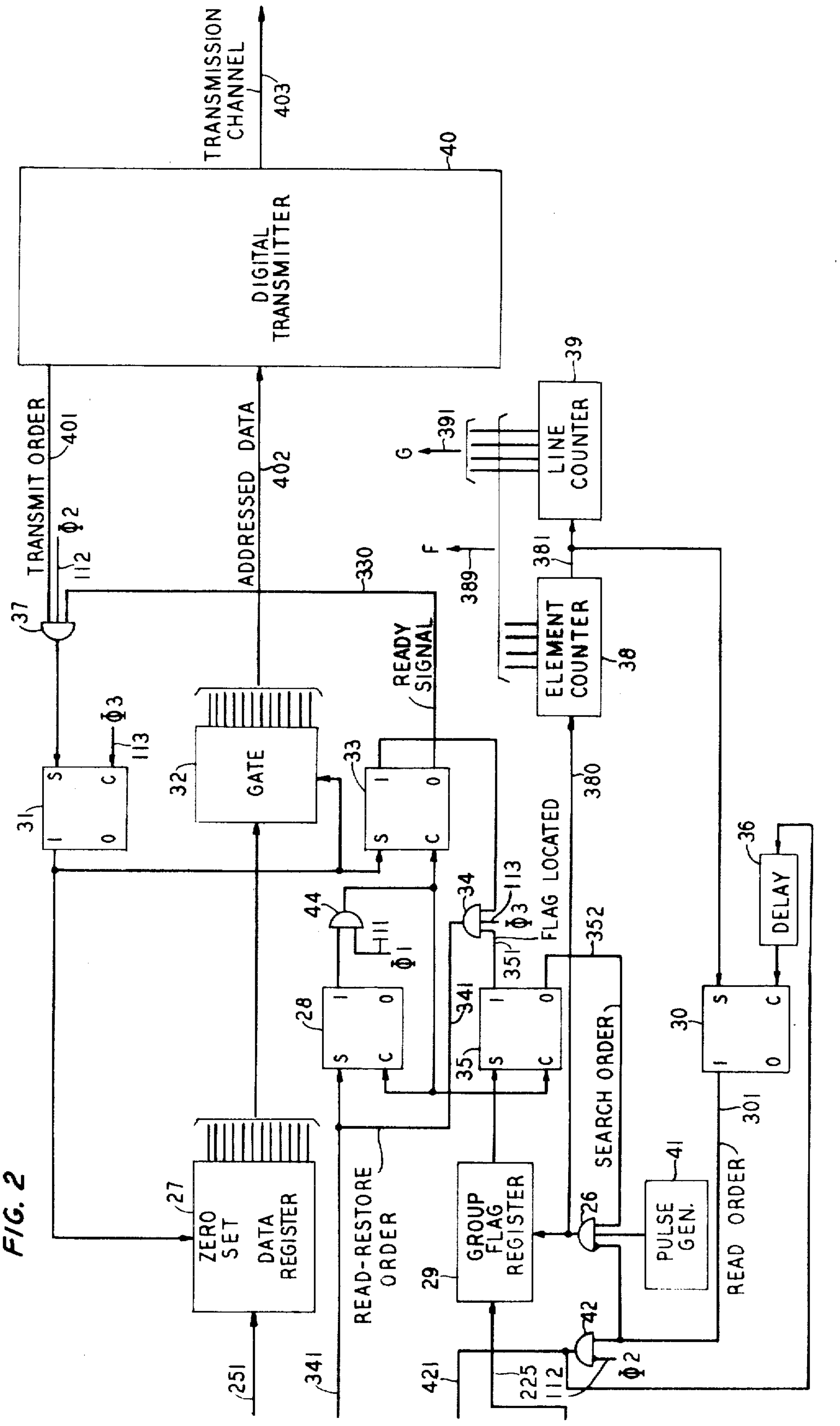

In the drawing a source of framed digital data 10, such as a camera and analog-to-digital converter, provides a digital word on bus 101 whose number value is an indication of the signal amplitude at that instant. Source 10 is coupled by way of line 102 to address and sync generator 11 which provides on bus 110 a digital word A the value of which is an indication of the time position of the sample on bus 101 within the frame interval. Synchronization on line 102 may originate in either the sync generator 11 location or the source 10 location. Bus 101 and bus 110 like all other lines of the drawing referred to as buses in this specification, are actually several transmission paths in parallel, one path for each bit of the digital word said to be transmitted on the bus. Address and sync generator 11 also sequentially provides a timing pulse on each of the lines 111, 112 and 113 for each of the address words provided on bus 110. The first timing pulse $\Phi_1$ on line 111 is present during the first one-third of the interval during which the address word is present on bus 110. A second timing pulse $\Phi_2$ on line 112 and a third timing pulse $\Phi_3$ on line 113 are present during the second one-third and third one-third portions respectively of the interval during which a single address word is provided on bus 110.

Each sample on bus 101 is coupled to one input of a two input comparison circuit 13. The other input of comparison circuit 13 is connected to the output of a frame memory 21 through a transmission gate 17 which is inhibited during the third timing interval when the timing pulse $\Phi_3$ is present on line 113. The address word A from bus 110 is coupled through a transmission gate 19 to an address input of the frame memory 21 (except during the third timing pulse interval $\Phi_3$ when transmission gate 19 is also inhibited). Each of the single boxes designated in the drawing as a gate and described in the specification as a transmission gate is actually a plurality of transmission gates, one for each of the transmission paths contained in the bus or buses connected as inputs to the box designated as a transmission gate.

Frame memory 21 has address locations equal in number to the number of samples within each frame of the signal provided by source 10. If that source is providing samples from a video signal the number of samples will substantially equal the number of picture elements scanned by the video camera. If source 10 is providing samples from some other set of sources such as telemetering data sensors, frame memory 21 has an address location for each of the data sensors.

The first timing pulse $\Phi_1$ on line 111 is coupled to the read input 213 of frame memory 21. In response to this pulse the digital word which is stored in the address location identified by the address word A is read out of frame memory 21 by way of its data output and coupled through transmission gate 17 to the above-mentioned other input of comparison circuit 13. If the amplitudes represented by the two digital words, one from source 10 and the other from frame memory 21, are determined by comparison circuit 13 to differ by some predetermined threshold difference, comparison circuit 13 produces an energizing signal on line 131. If the two digital words to not differ in amplitude by an amount in excess of this threshold difference, no energizing signal is produced on line 131. If the difference is greater than the threshold and therefore deemed to be significant, the energizing signal on line 131 enables the control input of a transmission gate 14. The input of gate 14 is connected to bus 101 and its output is connected to the data input of frame memory 21. Enabling of gate 14 causes the new digital word presented by source 10 on bus 101 to be coupled into frame memory 21 at the location indicated by address word A when the second timing pulse $\Phi_2$ from line 112 energizes the write input of frame memory 21. If the difference between the two digital words is not significant, no energizing signal is presented by comparison circuit 13 on line 131, and the lack of an energizing signal at the inhibit input of a transmission gate 15, connected to line 131, permits transmission gate 15 to be enabled. Gate 15 having its input connected to the output of gate 17 and its output connected to the data input of frame memory 21 couples the previously stored digital word into frame memory 21 when the write input of memory 21 is energized by the second timing pulse $\Phi_2$ from line 112. In this way digital words within frame memory 21 are recirculated during each frame interval with the new digital words which have been found to represent significant changes being utilized to update the information stored within frame memory 21.

If the difference is significant and an energizing signal appears on line 131 this signal also energizes one input of an AND gate AND gate 18, the other input of which is connected to line 112 to receive the second pulse $\Phi_2$. Consequently, if the difference is significant AND gate 18 is energized, thereby coupling the energizing signal to a write input and data input of a flag memory 22 at the location designated by the digital word presented to its address input. Flag memory 22 has address locations equal in number to, and having a 1 to 1 equivalence with, the address locations in frame memory 21. Each address location, however, within flag memory 22 need only be capable of storing a single bit. The presence of an energizing signal within any one of the address locations of flag memory 22 indicates that a significant difference has been found to exist in the amplitude represented by the digital word stored in that address location of frame memory 21.

The second timing pulse $\Phi_2$ from line 112 also enables a transmission gate 23 which in response thereto couples the address word A from bus 110 of generator 11 through to the address inputs of flag memory 22. For video signals the address input of flag memory 22 is separated into two parts. One input 227 couples that portion of the address word A which designates the line of the video signal from which a sample has been obtained. The other address input 228 couples that portion of the address word A which designates the number of the sample or picture element number within the video line designated at input 227. Flag memory 22 as well as frame memory 21 is advantageously constructed so that each row of the memory corresponds to one line of the input video signal and each memory cell within each row corresponds to a different picture element or sample within the video line.

In summary, the video samples presented on bus 101 are individually compared with their corresponding samples stored within frame memory 21. If a sample is determined to represent a significant change in video amplitude, that sample is inserted into frame memory 21 in place of the previously stored sample and in addition an energizing signal is stored in flag memory 22 at the address location corresponding to that sample.

To compare and store the input data from source 10, frame memory 21 is read and written into on a regular basis by each of the energizing timing pulses $\Phi_1$ and $\Phi_2$ which appear on lines 111 and 112 from generator 11. To read information out of frame memory 21 for transmission to the receiving location, however, memory 21 is read only in response to a transmit order on a line 401 from a digital transmitter 40. Each order may or may not be on a regular basis depending on whether digital transmitter 40 is coupling to a transmission channel 403 only those signals which are generated by source 10 or is also coupling signals generated by several sources on a time division multiplexing basis. Even if transmitter 40 transmits only those samples which are generated by source 10, the transmit order on line 401 does not occur at the same rate at which digital words are presented on bus 101. The predetermined rate at which transmit orders are caused to occur is related to the statistics of the signal whose samples are provided by source 10 on bus 101. For video signals of the type generated in connection with video-telephone systems, on the average about one-sixteenth of the samples in each frame are expected to change significantly from one frame to the next. In order to accommodate intervals during which there is a large amount of activity in the picture, a transmit order rate is chosen to be equal to 10 percent of the rate at which samples appear on bus 101.

Read out of frame memory 21 by digital transmitter 40 occurs in three phases, each one of which is triggered by one of the three timing pulses $\Phi_1$, $\Phi_2$ or $\Phi_3$ provided by address and sync generator 11. During the second timing pulse interval, if a transmit order is present on line 401 from transmitter 40, and a ready signal is provided on line 330 by an energizing signal at the 0 output of a flip-flop 33, the word previously detected as a flagged word and removed from frame memory 21 is coupled from a data register 27 through a gate 32 to the digital transmitter 40. During the third timing pulse interval, if a word has been transmitted during the previous second timing pulse interval and further if a new flagged word has been located by the searching circuit to be described hereinafter, then the new located flagged word is extracted from frame memory 21 and placed in data register 27. Finally, during the first timing pulse interval, if a word has been extracted during the previous third timing interval, a ready signal is provided at the O output of flip-flop 33, and a search order is initiated for the purpose of locating the next flagged word to be extracted from the frame memory during a succeeding third timing interval. If this search is completed before the second timing interval immediately following, then the circuit is again ready to couple an addressed word to the digital transmitter, providing that the transmitter has requested the word by a transmit order. It should be noted, however, that since transmit orders on line 401 to not occur at the same frequency as digital words on bus 101, the above-mentioned search which is initiated during the first timing pulse interval may continue over several periods during which second and third timing pulses are generated for which no action is initiated in the apparatus relating to read out of frame memory 21 for the purpose of transmission. The first, second and third timing pulses serve only to synchronize the performance of the apparatus relating to transmission. They do not necessarily for each occurrence initiate action in the transmission apparatus.

The transmit order on line 401 is coupled to one input of a three input AND gate 37. A second input of AND gate 37 is connected to receive the ready signal or energizing signal on line 330 from the 0 output of a flip-flop 33. If this ready signal is present when the transmit order is presented on line 401, the second timing pulse 2 activates the third input of AND gate 37 thereby causing the output of AND gate 37 to set flip-flop 31. The energizing signal resulting at the 1 output of flip-flop 31 energizes the control input of transmission gate 32 and the set input of flip-flop 33. With gate 32 enabled, the addressed data word stored in data register 27 is coupled through gate 32 over bus 402 to digital transmitter 40.

During the occurrence of each third timing pulse $\Phi_3$ flip-flop 31 is cleared. The transient which results from the removal of an energizing signal at the 1 output of flip-flop 31 when it is cleared causes the activation of the zero set input of data register 27 which in turn results in clearing all of the old data from register 27 in preparation to receiving a new word during the third timing interval. With flip-flop 33 set by the above-mentioned simultaneous occurrence of a ready signal, transmit order and second timing pulse, the energizing signal from its 1 output is coupled to one input of a three input AND gate 34. If a second input of AND gate 34 is energized by the 1 output of a flip-flop 35 indicating that a flagged word has been located during a previous search, appearance of the third timing pulse $\Phi_3$ at the third input of AND gate 34 causes a read-restore order to be generated on line 341 at the output of AND gate 34. The read-restore order on line 341 enables the control input of transmission gate 25, the read-restore input of frame memory 21 and one input of a two input AND gate 43. With the third timing pulse provided to the other input of AND gate 43, gate 43 is energized thereby enabling the control input of a transmission gate 20.

The address location of the flagged word to be read out of frame memory 21 during the third timing interval is provided at the outputs of element counter 38 and line counter 39, each of which is triggered during the search for a flagged word in a manner to be described hereinafter. The output word G from line counter 39 indicates the number of the line in which the flagged word is located, whereas the output from element counter 38 indicates the location or picture element number within the line. The address indicated by the entire address word provided by both counters, indicated in the drawing as address word F, is coupled through transmission gate 20 to the address input of frame memory 21 when AND gate 43 is energized. The read-restore order on line 341 provided to the read-restore input of frame memory 21 causes the word located within frame memory 21 at address location F to be coupled out of frame memory 21 by way of its data output to the input of transmission gate 25. The address corresponding to this word, that is address word F, is also coupled to the input of gate 25. Since the control input of gate 25 is also energized by the read-restore order on line 341, this entire addressed word is coupled through gate 25 to data register 27 by way of bus 251 in response to the read-restore order. Accordingly, a new addressed word is stored in register 27 during the third timing interval following a second timing interval during which a transmit order has been acted upon, providing a flagged word has been previously found as indicated by a 1 output from flip-flop 35 on line 351.

The read-restore order on line 341 is also utilized to set a flip-flop 28 whose 1 output provides an energizing signal to one input of an AND gate 44. The other input of AND gate 44 is energized by each first timing pulse $\Phi_1$. Consequently, if the 1 output of flip-flop 28 has been energized by a read-restore order during the third timing interval, a first timing pulse $\Phi_1$ causes AND gate 44 to be activated, thereby energizing clear inputs of flip-flops 33, 28 and 35. Flip-flop 28 is thereby cleared in preparation to receiving the next read-restore order at its set input. Energizing the clear input of flip-flop 33 causes the 0 output of flip-flop 33 to be energized, thereby providing a ready signal to one input of AND gate 37. This ready signal refers to the word which has been extracted from frame memory 21 and stored in data register 27 during the immediately preceding third timing interval. AND gate 37 is now permitted to again react to a transmit order on line 401 during the second timing pulse interval to couple this word in register 27 through gate 32 to the transmitter 40.

The clearing of flip-flop 35 by AND gate 44 causes an energizing signal to appear at the 0 output of flip-flop 35 which represents an order to search for a new flagged word in flag memory 22. This energizing signal on line 352 from the 0 output of flip-flop 35 energizes one input of a three input AND gate 26. A second input of AND gate 26 is connected to the output of a pulse generator 41 which provides output pulses at a rate much faster than the rate at which digital words are presented by source 10 on bus 101. The pulses from generator 41 should occur as rapidly as possible limited only by the rate at which the circuits to which it is connected will react to the pulses. The third input of AND gate 26 is an inhibit input connected by line 301 to the 1 output of a flip-flop 30.

FLIP-flop 30 provides an energizing signal at its 1 output representing a read order for flag memory 22 each time that its set input is triggered by output line 381 of element counter 38. An energizing pulse is provided at output line 381 of counter 38 each time that counter 38 changes from the count in address word F which corresponds to the last picture element in a line of video to the count which corresponds to the first picture element in a line of video. Line counter 39 responds to the pulse on output line 381 by advancing its count (equivalent to address word G) by one to indicate that the picture element address words from counter 38 after this instant belong to the next line of video. Assuming for the moment that the set input of flip-flop 30 has been energized by an output from counter 38 to produce a read order on line 301, the inhibit input of gate 26 during this read order will prevent the energizing pulses of generator 41 from being coupled through AND gate 26 to the control input of a group flag register 29. The read order on line 301 is coupled to one input of an AND gate 42 whose only other input is an inhibit input which is energized by the second timing pulse. The inhibition provided to AND gate 42 during this second interval is necessary in order to prevent the read order on line 201 from being coupled through AND gate 42 to the read input of flag memory 22 during the second timing interval when, as pointed out hereinabove, flag memory 22 is utilized to receive a flag at the address location corresponding to an input digital word on bus 101 which has changed from a previous frame. During either the first timing interval or third timing interval the read order on line 301 is coupled through AND gate 42 to the read input of flag memory 22, thereby causing an entire line of flag memory 22 to be read out of its data output by way of bus 225 into the group flag register 29. The particular line chosen is identified by the digital word provided at output 391 of line counter 39. This line address, designated in the drawing by letter G, is coupled through transmission gate 24 by way of bus 27 to the line address input of flag memory 22 providing the inhibit control input of gate 24 is not energized by the second timing pulse. Hence, a read order on line 301 results in reading out an entire line of data from flag memory 22 corresponding to the address provided by line counter 39.

At a predetermined interval after AND gate 42 is energized, equal in duration to the time required to read the line out of memory 22 into register 29, delay circuit 36 couples the output from AND gate 42 to the clear input of flip-flop 30, thereby placing flip-flop 30 in its cleared state in preparation to receiving the next output pulse on line 381 from element counter 38. Clearing of flip-flop 30 also removes the energizing signal at the inhibit input of AND gate 26. If, at this time, a search order is also present on line 352, the energizing pulses from pulse generator 41 are coupled through AND gate 26, both to the control input of group flag register 29 and to the trigger input of element counter 38. Each pulse from generator 41 during the search order causes a single bit to be shifted out of register 29 to the set input of flip-flop 35 and also to advance the count in element counter 38 by one. The line of data from memory 22 is placed in register 29 so that the first bit presented by the register output is equivalent to the first picture element in the line. Each pulse from generator 41 shifts the bit corresponding to the next succeeding picture element to the output of the register, and the count provided by element counter 38 always corresponds to the picture element whose bit is at the output of register 29.

This action by generator 41 on register 29 and counter 38 will continue until the bit appearing at the output of register 29 contains an energizing signal or flag. Appearance of a flag at the output of register 29 sets flip-flop 35 which in turn provides an energizing signal at its 1 output indicating that a flag has been located. The setting of flip-flop 35 removes the search order on line 352, thereby terminating the action of generator 41 on both register 29 and element counter 38. The address provided as address word F at the outputs of counters 38 and 39 at this point corresponds to the previous memory location of the flag which has set flip-flop 35. The energizing signal provided at the 1 output of flip-flop 35 to the input of AND gate 34 indicates that a flagged word has been located which word may be read out of frame memory 21 during the next third timing interval at address location F providing data register 27 has been emptied and zero set as indicated by an energizing signal at the 1 output of flip-flop 33.

In summary, frame memory 21 and flag memory 22 are utilized during the first and second timing pulse intervals to compare the stored words within the frame memory with the new digital words presented by source 10. If a significant difference exists between the new word and the stored word, the new word is entered into the frame memory and a flag is inserted into the flag memory at an address location corresponding to the changed word. During either the first or third timing interval an entire line is read out of flag memory 22 into the group flag register 29. This entire line is searched in response to a first timing pulse providing a search is warranted in that data register 27 has previously been emptied of its addressed word. Detection of a flag within any picture element location of the line stored within register 29 produces a flag located signal on line 351 at one input of AND gate 34 which may then respond during the third timing interval to produce a read-restore order and extract the digital word corresponding to this flag from frame memory 21.

Digital transmitter 40 can, as indicated hereinabove, combine the addressed word from bus 402 on a time division multiplexing basis with digital words from several other sources before coupling the addressed words to a transmission channel. Or transmitter 40 can simply change the addressed words on bus 402 from the parallel data form provided on bus 402 to a stream of serial bits on transmission channel 403. If the samples on bus 101 have been encoded into 8 bit digital words and the video format being transmitted has 40,000 picture elements or samples per frame, each transmit order (one for every ten input samples) along with a straightforward encoding of the address information will result in the transmission of 26 bits. The transmission of ten 8 bit digital words directly without redundancy reduction would require 80 bits. Hence a bandwidth compression ratio of about 3 is obtainable with the present invention even with straightforward addressing of picture elements. With a more sophisticated addressing scheme of the type disclosed in the above-identified copending application by F. W. Mounts, higher bandwidth compression ratios are possible.

A receiver at the other end of transmission channel 401, replenishes a receiving frame memory with the addressed words from bus 402. Simple sequential scanning of the receiving frame memory and a digital-to-analog encoding of the resulting digital words provides a continuous stream of samples which may be filtered to provide a continuous analogue video signal.

Techniques for organizing frame memories of the type required at the transmitting and receiving locations are well established in the computer art. To obtain the necessary speed of operation, memories with fast cycling storage cells may be utilized, or in the alternative, slower storage cells may be utilized, or in the alternative, slower storage cells may be utilized with fast register circuits by transferring the data into and out of the memories in batches.

The above described embodiment is merely illustrative of the principles embodied within the present invention. Changes may be made by those skilled in the art without departing from the spirit and scope of the present invention. For example, the number of bits stored within flag memory 22 may be utilized as a control on the threshold difference required by comparison circuit 13. In this way, larger threshold differences can be required in those situations where a large amount of activity has produced a large number of flagged words within frame memory 21. In addition, a data register capable of storing more than one addressed word may be utilized in place of register 27 or a small buffer memory could be placed in digital transmitter 40 to accommodate a digital transmitter which can more efficiently utilize more than a single addressed word. The ready signal at the 0 output of flip-flop 33 can also be coupled to digital transmitter 40 in order that a time division multiplexing transmitter can more efficiently assess the current status of the apparatus being utilized to process the data from source 10.

We claim:

1. Redundancy reduction apparatus for use with a signal having samples from a set of several sources comprising a first memory means for storing a set of samples one for each of said sources, means for comparing each new sample with its corresponding sample in said first memory means to produce an energizing signal if a difference exists, means responsive to said energizing signal for replacing said corresponding sample in said first memory means with said new sample, a second memory means having address locations equal at least in number to the number of samples stored in said first memory means for storing said energizing signal in the location corresponding to said new sample, searching means for locating an energizing signal in said second memory means, and means for transmitting a sample from said first memory means which corresponds to a located energizing signal.

2. Redundancy reduction apparatus for use with an input video signal having time subintervals designated as frames and lines and a predetermined number of samples per line, said apparatus comprising a frame memory means for storing digital words corresponding to the video amplitude for each sample within a video frame, means for comparing each sample from said input signal with a digital word from said frame memory means having the same location within said video frame to produce an energizing signal when the comparison indicates that a significant difference exists, means responsive to said energizing signal for replacing said digital word from said frame memory means with said sample from said input signal, a flag memory means having address locations equal at least in number to the number of digital words stored in said frame memory means, means for storing said energizing signal in said flag memory means at an address location corresponding to the sample being compared, means for detecting the location of an energizing signal within said flag memory, and means for reading out the digital word in said frame memory corresponding to a detected energizing signal.

3. Apparatus as defined in claim 2 wherein said means for detecting an energizing signal includes means for storing an entire line of address locations from said flag memory means, and means for interrogating said line storing means to determine which location within said line contains an energizing signal.

4. Apparatus for removing the redundant samples in an input signal from a source of framed digital data, said apparatus comprising an address and sync generator for providing a digital word at its output which indicates the position of each sample within a frame of said input signal and for further providing a plurality of successive timing pulses during each output address word, a frame memory means having address locations for storing an entire frame of samples, means for reading said frame memory in response to a first one of said plurality of timing pulses at the location indicated by the address word at the output of said generator, means for comparing a sample from said input signal with the sample provided by the reading of said frame memory means, means for generating a flag signal if the difference between the input sample and sample from said frame memory exceeds a predetermined threshold, means responsive to said flag signal for replacing a sample in said frame memory with a corresponding input sample, a flag memory means having address locations each with a one-to-one correspondence to an address location in said frame memory means, means for writing an input sample into said frame memory means in response to said flag signal during a second of said plurality of timing pulses, means for writing a generated flag signal into said flag memory during the second of said plurality of timing pulses, means for detecting the location of a flag signal in said flag memory means, means for reading and restoring a digital word in said frame memory means corresponding to a located flag signal during a third of said plurality of timing pulses, and means for coupling the digital word obtained from said frame memory means during said third timing pulse to a digital transmitter.

5. Apparatus for coupling nonredundant samples to a digital transmitter from input video signal samples in response to an order from the digital transmitter which order appears at a rate less than the rate at which input video samples appear, means for storing an entire frame of video samples, means for comparing each sample in said input signal with a stored sample corresponding to the same time position in the video frame to produce an output flag signal if a difference between the two samples is greater than a predetermined threshold, means responsive to said flag signal for replacing said stored sample with said sample in said input signal, a flag memory means having an address location corresponding to each address location in said frame memory means, means for storing a flag signal in said flag memory means at an address location corresponding to the input video sample which caused said comparing means to produce said flag signal, means for locating a flag signal in said flag memory means, a register means for storing a digital word from said frame memory means which corresponds to the located flag signal in said flag memory means, and means for reading out said register means in response to a transmit order from the digital transmitter.

6. A redundancy reduction method of transmitting information from a signal having a predetermined number of samples in each successive framed interval comprising storing an entire frame of samples, comparing each stored sample with a corresponding new sample from a succeeding frame, replacing each stored sample with a new sample from a succeeding frame if the new sample is different from the stored sample, marking the different new sample to indicate that it should be considered for transmission, locating a stored marked sample, transmitting a located sample, and replacing a marked sample in storage with a second new sample from still another succeeding frame if the second new sample is different even though said marked sample has not been transmitted.

7. A method as defined in claim 6 wherein the signal is a video signal and locating a stored marked sample includes interrogating an entire video line of stored samples.